(12) United States Patent
Sikora et al.

(10) Patent No.: US 12,230,276 B2
(45) Date of Patent: Feb. 18, 2025

(54) COMPUTING SYSTEMS FOR RAPIDLY COLLECTING DIGITAL WITNESS STATEMENTS AND EFFICIENTLY CORRECTING TRANSCRIPTION ERRORS

(71) Applicant: MOTOROLA SOLUTIONS, INC., Chicago, IL (US)

(72) Inventors: Szymon Sikora, Cracow (PL); Jacek Doniec, Luborzyca (PL); Miroslaw Kawa, Kryspinow (PL); Artur Ziajko, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 458 days.

(21) Appl. No.: 17/658,115

(22) Filed: Apr. 6, 2022

(65) Prior Publication Data
US 2023/0326460 A1  Oct. 12, 2023

(51) Int. Cl.
*G10L 15/26* (2006.01)
*G06F 40/197* (2020.01)
*G06F 40/35* (2020.01)
*G10L 15/04* (2013.01)
*G10L 15/18* (2013.01)
*G10L 15/32* (2013.01)
*G10L 15/08* (2006.01)
*G10L 15/22* (2006.01)

(52) U.S. Cl.
CPC ........... *G10L 15/26* (2013.01); *G06F 40/197* (2020.01); *G06F 40/35* (2020.01); *G10L 15/04* (2013.01); *G10L 15/1822* (2013.01); *G10L 15/32* (2013.01); *G10L 15/08* (2013.01); *G10L 15/1815* (2013.01); *G10L 2015/221* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 8,655,665 B2 | 2/2014 | Howes | |
| 9,240,181 B2 * | 1/2016 | Khare | G10L 15/187 |
| 9,710,819 B2 | 7/2017 | Cloran et al. | |
| 10,068,617 B2 | 9/2018 | Loganathan et al. | |
| 10,839,335 B2 * | 11/2020 | Weisman | G06N 20/00 |
| 11,024,291 B2 * | 6/2021 | Castan Lavilla | G10L 25/51 |
| 11,245,950 B1 * | 2/2022 | Mahar | G10L 15/26 |
| 11,443,734 B2 * | 9/2022 | Finlay | G10L 15/08 |
| 11,587,549 B2 * | 2/2023 | Finlay | G06F 16/685 |

(Continued)

*Primary Examiner* — Richard Z Zhu

(57) ABSTRACT

Systems, methods, and devices disclosed herein can capture an audio recording of an utterance, generate a transcription based on the audio recording, and generate a score for a section of the transcription that reflects a level of confidence that at least one word in the section was correctly transcribed. Content of the section is rendered in a field on a display. Also, a timeline for the audio recording is rendered. If the score does not satisfy a condition, the fill scheme applied to a segment of the timeline that maps to the section may differ from a fill scheme that is applied to the remainder of the timeline. An additional audio recording is then captured and transcribed. An additional timeline is rendered for the additional audio recording alongside the timeline and is aligned with the section. The transcription of the additional audio recording is used to replace the section.

17 Claims, 8 Drawing Sheets

(56) References Cited

U.S. PATENT DOCUMENTS

| | | | |
|---|---|---|---|
| 11,922,944 B2 * | 3/2024 | Faria | G10L 15/08 |
| 2007/0106508 A1 | 5/2007 | Kahn et al. | |
| 2009/0306981 A1 * | 12/2009 | Cromack | G06F 16/685 |
| | | | 707/E17.103 |
| 2012/0010869 A1 * | 1/2012 | McCarley | G10L 15/26 |
| | | | 704/3 |
| 2017/0287465 A1 * | 10/2017 | Zhao | G10L 13/08 |
| 2022/0059095 A1 * | 2/2022 | Faria | G10L 15/183 |

* cited by examiner

COMPUTING SYSTEMS FOR RAPIDLY COLLECTING DIGITAL WITNESS STATEMENTS AND EFFICIENTLY CORRECTING TRANSCRIPTION ERRORS

BACKGROUND

Law enforcement agencies often seek to collect statements from witnesses who were present at the scenes of incidents that are being investigated. Depending on the nature of an incident, the location of the incident, the time of day when the incident occurred, and many other factors, there may be hundreds of witnesses from whom investigators seek to collect statements. Information found in any one of those statements may be instrumental in helping investigators reconstruct how the incident occurred and in ultimately bringing about a resolution to a case file for the incident.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various examples of concepts that include the claimed invention, and to explain various principles and advantages of those examples.

Figure 1:
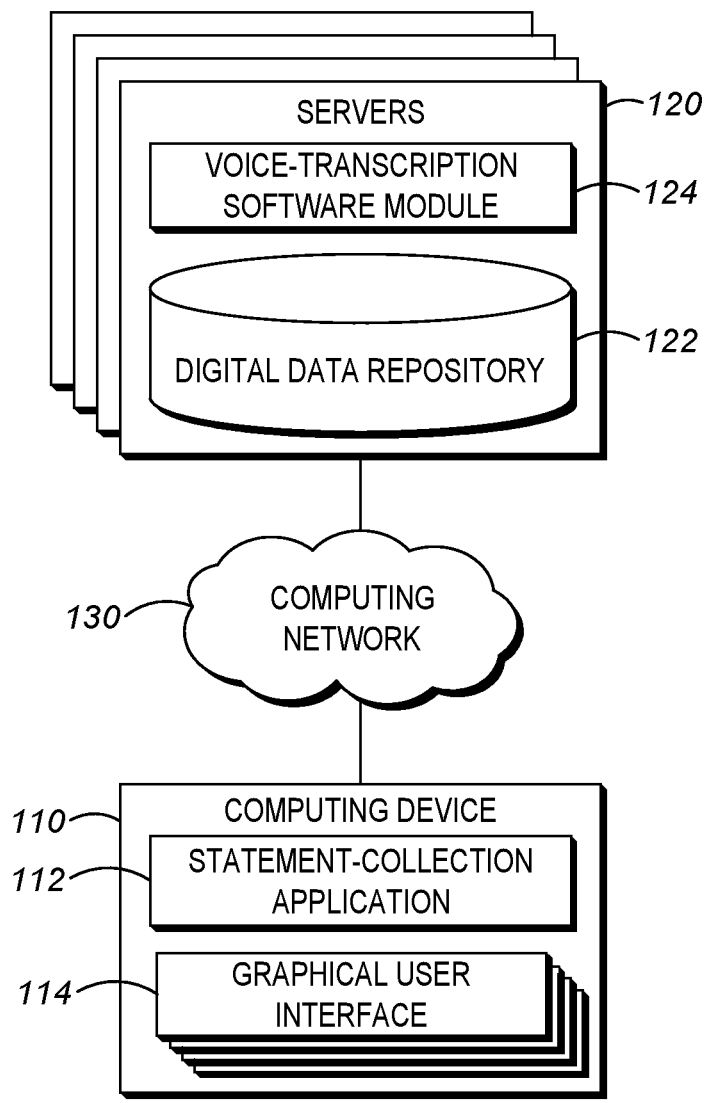
FIG. 1 illustrates a computing environment in which systems described herein may operate, according to one example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION OF THE INVENTION

Modern technology (e.g., smart phones and tablet computers) can facilitate fast and efficient collection of digital witness statements. Since many people can speak more quickly than then can write, witnesses may find it more convenient to provide statements verbally than through typing or handwriting. Typing, for example, may be a challenge if a virtual keyboard on a small screen of a portable device is used. Even if a keyboard is available, the average person can type about forty words per minute—a rate that is much slower than the average person's speaking rate (which is about 120 to 150 words per minute). Writing by hand is even slower than typing and also poses other problems, since many people's handwriting is illegible and handwritten notes are difficult for computing devices to translate accurately into text that is searchable and readable. A potential witness may decline to provide a written statement simply because of the inconvenience and the time commitment involved. For example, a witness who sees an automobile accident while en route to work may decline to provide a written statement because the witness is worried about arriving late for work. However, the witness may be willing to provide a statement if the option of speaking the statement aloud into a recording device is available because the witness may be obliged to spend much less time in the process of providing the statement. Witness statements that are recorded in digital audio formats can be backed up easily and distributed to collaborative investigators in different geographical locations quickly via modern computing networks. Thus, audio recording technology can serve both the interests of witnesses (e.g., by reducing the amount of time it takes to provide a statement) and of officers (e.g., by facilitating easy recording, backup, and distribution of witness statements).

An officer who arrives at the scene of an automobile accident may, for example, provide a digital link (e.g., a hyperlink) to a person who witnessed the accident and ask the witness to use the witness's own device to follow the link to provide a digital witness statement via an audio recording. The officer may provide the link via a Quick Response (QR) code or hand a tablet computer to a person who witnessed the accident and ask the person to record a statement via the tablet computer (e.g., by capturing the statement in an audio format via a microphone in the tablet computer).

While devices such as smart phones and tablet computers can facilitate efficient use of witness time and rapid recordation, storage, and distribution of digital witness statements, there are some disadvantages to collecting digital witness statements as audio recordings alone. For example, investigators generally cannot perform simple keyword searches or more advanced semantic searches on audio recordings directly. However, investigators may find it prudent to perform such searching for the sake of efficiency. For example, it may be infeasible for an agency that has limited personnel hours available (e.g., due to budget constraints mandated by law) to have an investigator listen to hours of witness statements (e.g., provided by hundreds of witnesses) in search of specific words or phrases. Manually transcribing the content of the witness statements may be infeasible for similar reasons. Therefore, investigators may opt to use automatic voice-transcription software (i.e., voice-recognition software, speech-recognition software, voice-to-text software, or speech-to-text software) to transcribe the content of audio recordings of witness statements. In this manner, investigators can generate transcribed versions of the witness statements that include searchable text.

Voice-transcription software, however, can be error prone—especially under circumstances in which on-scene witness statements are likely to be recorded. For example, voice-transcription software is unlikely to have been calibrated for the voice of a random witness at the scene of an accident. Thus, even voice-transcription software that has the capacity to train itself to recognize the idiosyncrasies of individual voices (e.g., enunciation patterns, accents, speaking speed, lisps, stutters, slang use, etc.) will likely not have been trained using the speech of the particular witness who provides a statement on-scene. Furthermore, a cacophony of background noise at a scene (e.g., voices of other people at the scene, sirens, the hum of vehicular engines, wind, etc.) may obscure the signal of a witness's voice, thereby causing voice-transcription software to make transcription errors at a higher rate than would be expected in a studio environment.

Transcription errors are a nuisance in any context, but transcription errors in the context of witness statements may result in very serious consequences because outcomes of criminal and civil investigations may hinge on the content of witness statements. If a single word is missed or improperly transcribed, a keyword search that an investigator performs for the word through transcribed witness statements may return no results. As a result, the investigator may overlook valuable evidence on which questions of criminal guilt and civil liability may hinge. For example, suppose a witness says "I heard the gunman fire thirteen gunshots in a span of about sixty seconds" while describing a mass shooting that the witness saw. Also suppose voice-transcription software incorrectly transcribes this statement as "I heard the gunman fire thirty gunshots in a span of about sixteen seconds." The transcription errors may cause the investigator to assume that the gunman used a firearm with a faster firing rate and a larger ammunition capacity than the actual firearm used. As a result, the investigator may erroneously exclude the actual firearm as the weapon that was used in the mass shooting and may erroneously exclude people who did not have access to firearms that have the faster firing rate and the larger ammunition capacity as suspects.

One option is to present the transcription of a witness statement to the witness for verification on the recording device before storing the witness statement in a digital repository. However, a witness may be disinclined to read through the entire text of a lengthy witness statement to find a few errors that might be buried therein. An error might be hidden in the text like a needle in a haystack and a witness who is in a hurry may simply verify without reading the text closely, as many people are inclined to do when accepting lengthy terms and conditions presented with scroll bars on small screens. Furthermore, even if a witness does spot an error, the witness may be obliged to rekey information. Even if the witness does provide a supplementary statement to correct a transcription error, a person may be obliged to cross reference the supplementary statement to the content of the original statement manually. An interface for making corrections may be non-intuitive, confusing, and difficult to use, thus making it less likely that statements will be provided at all and more likely that statements that are provided will be truncated by an exasperated witness who lacks the time to decipher how to use the interface.

Thus, systems, methods, and devices that can collect audio recordings of witness statements, transcribe those statements, help witnesses identify transcription errors quickly, and empower witnesses to insert corrections seamlessly into both the audio recording and the transcription would be highly desirable. The systems, methods, and devices described herein achieve these and other objectives, thereby providing valuable advantages over existing approaches for recording witness statements. Various examples are discussed below.

FIG. 1 illustrates a computing environment 100 in which systems described herein may operate, according to one example. As shown, the computing environment 100 includes a computing device 110 and servers 120. The servers 120 may be in communication with each other and with the computing device 110 via the computing network 130. The computing device 110 may be, for example, a smart phone, a tablet computer, a laptop computer, a desktop computer, or some other type of electronic device that is capable of receiving user inputs (e.g., text, audio, or video) through Input/Output (I/O) peripherals (e.g., microphones, touch screens, keyboards, computer mice, virtual reality headsets, etc.) and storing those inputs into a digital format.

The statement-collection application 112 is a software application that, when accessed via the computing device 110, allows a user to provide a digital witness statement in response to a request (e.g., from an officer of the law). Specifically, the digital witness statement may be provided in a pure audio format (e.g., via a microphone) or in a format that combines both audio and visual formats (e.g., via a digital camera that is in communication with the computing device 110), or a combination thereof. The statement-collection application 112 may be a browser, a web application accessed through a browser, an application that executes locally on the computing device 110, or a combination thereof. Persons of skill in the art will understand that various components of the statement-collection application 112 may be executed on the computing device 110 or the servers 120 without departing from the spirit and scope of this disclosure. Similarly, any one of the components shown in the servers 120 (e.g., the voice-transcription software module 124 and the digital data repository 122) may reside partially or wholly on the computing device 110 without departing from the spirit and scope of this disclosure.

Persons of skill in the art will understand that the computing network 130 may comprise a wide area network (WAN) such as the Internet, a local area network (LAN), an enterprise network, a virtual private network (VPN), an Integrated Services Digital Network (ISDN) (e.g., which can transfer voice, video, and data over a digital connection), some other type of digital or analog communication network, or a combination thereof.

As one example of how the computing device 110 and the servers 120 may operate, consider the following scenario. Suppose the computing device 110 is provided to a user for the purpose of collecting a digital witness statement. The statement-collection application 112 accesses a microphone at the computing device 110 and commences capturing an audio recording of words that the user speaks aloud (which will be referred to herein as the initial audio recording for disambiguation as other audio recordings may also be made, as will be explained in greater detail below). While the user continues speaking, the statement-collection application 112 streams the initial audio recording to the voice-transcription software module 124 via the computing network 130. In response, the voice-transcription software module 124 generates a digital transcription (which will be referred to herein at the initial digital transcription) concurrently as the initial audio recording is being streamed and transmits the content of the initial digital transcription to the statement-collection application 112 via the computing network 130 as the content of the initial digital transcription is generated. The voice-transcription software module 124 further generates scores for sections of the initial digital transcription (e.g., words, phrases, or phonemes) that indicate levels of confidence that the sections were correctly transcribed and transmits the scores to the statement-collection application 112.

Persons of skill in the art will recognize that there are many software tools available that may serve as the voice-transcription software module 124. For example, the Microsoft® Cognitive Services Speech Software Development Kit (SDK) can be used to perform voice transcription and also provides a detailed output option that causes a confidence score for transcribed content to be provided in Javascript Object Notation (JSON) format (e.g., which is accessible via SpeechRecognitionResult.Properties[ResultProperty::JSON]). Carnegie Mellon University (CMU) Sphinx, the Google® Cloud Speech Application Programming Interface (API), International Business Machines (IBM) Watson™ Speech to Text, Wit.ai, and Houndify API are other examples of software tools that can be used to perform voice transcription and to provide confidence scores. An exhaustive discussion of the software tools available for voice transcription is beyond the scope of this disclosure.

Persons of skill in the art will also recognize that the initial audio recording may be stored or transmitted in a variety of formats that can store audio data or a combination of audio data and video data. Some example formats may be, for example, Advanced Audio Coding (AAC), Moving Picture Experts Group (MPEG), MPEG Audio Layer III (MP3), Waveform Audio Format (WAV), Audio Interchange File Format (AIFF), Windows Media Audio (WMA), Audio/Video Interleaved (AVI), Pulse Code Modulation (PCM), Bitstream (RAW), or some other type of format. An exhaustive list of possible formats for audio data is beyond the scope of this disclosure.

Figure 2A:
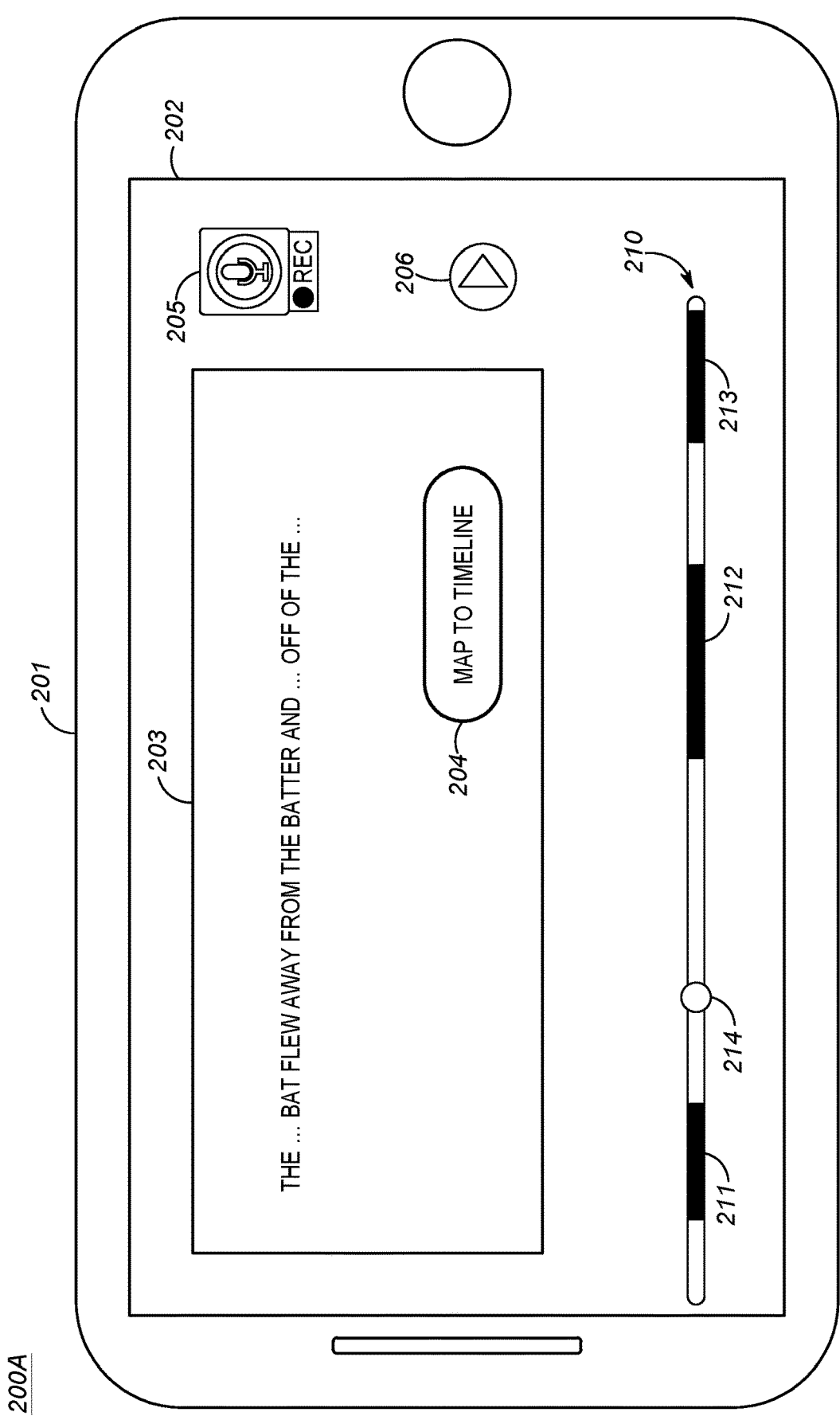
FIG. 2a illustrates a first view of a graphical user interface displayed on a touch screen of a computing device (e.g., a smart phone) in accordance with the systems described herein, according to one example.

The graphical user interface 114 displays the content of the transcription (e.g., via an electronic display such as a screen) in a text field for the user's inspection. For sections of the initial digital transcription for which the scores fail to satisfy a predefined condition (e.g., fail to meet a threshold score), the graphical user interface 114 may insert ellipses or some other type of indicator to alert the user that the content of those sections was not transcribed with a sufficient level of confidence. In addition, the graphical user interface 114 renders a timeline alongside the text field that includes the content of the initial digital transcription (e.g., as shown in the example of FIG. 2a below). The timeline (which will be referred to herein as the initial timeline) represents a time span in which the initial audio recording is recorded. Thus, each point on the initial timeline maps to a specific point in time in the initial audio recording. Segments of the initial timeline that map to sections of the initial digital transcription for which scores do not satisfy the predefined condition can be rendered with a fill scheme (e.g., a different color or a different fill pattern) than the remainder of the initial timeline, thereby facilitating quick and intuitive recognition of where sections of the initial audio recording that were transcribed with unsatisfactory confidence levels are located. The initial timeline may also include a slider that can be moved into a position on the initial timeline that corresponds to the beginning of a portion of the initial audio recording that the user wishes to play back (e.g., via speakers associated with the computing device 110) and view the section of the initial digital transcription that was transcribed from that portion of the initial audio recording in the text field (e.g., if the initial digital transcription includes too much text to be displayed at the same time in the text field).

Figure 2B:
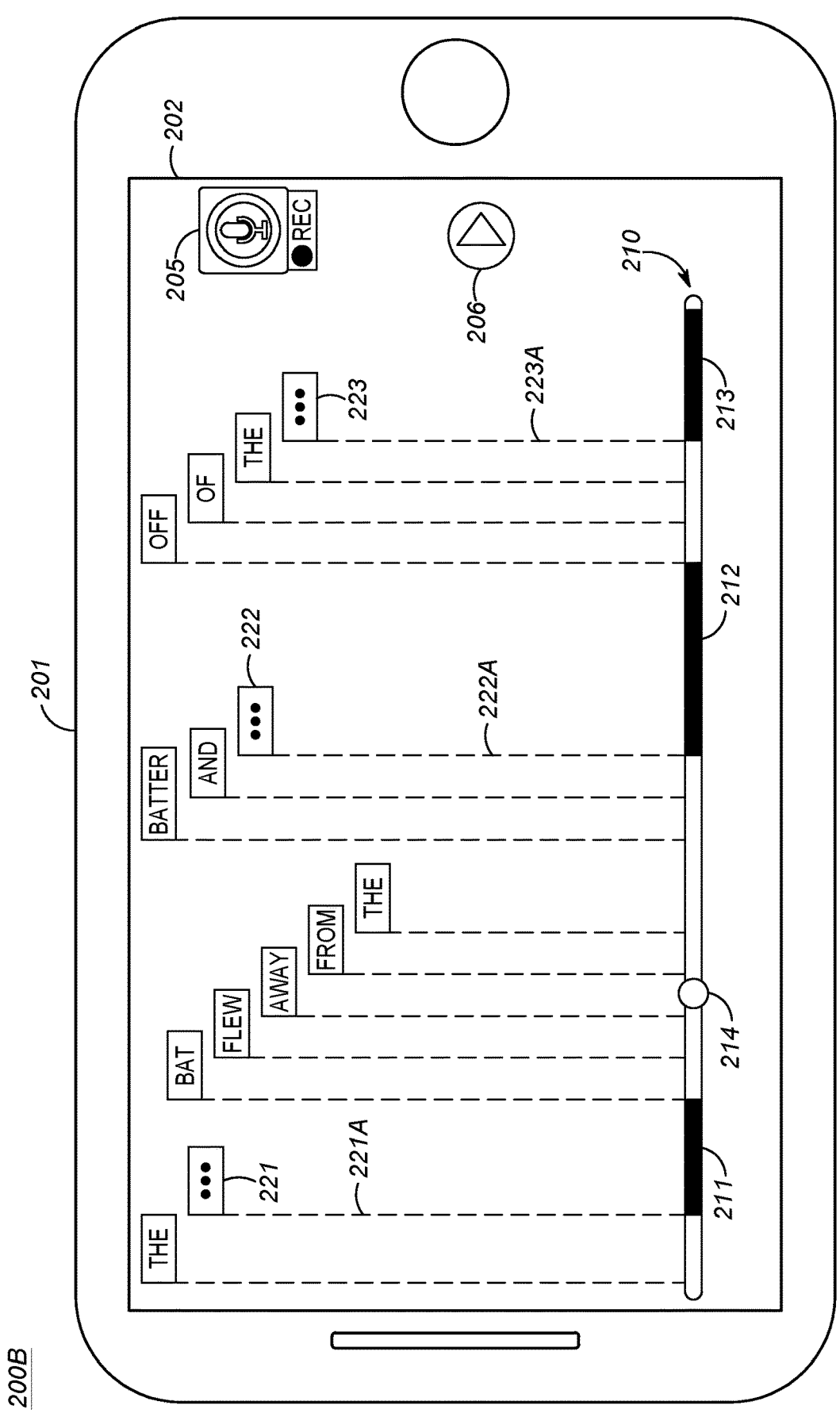
FIG. 2b illustrates a second view of the graphical user interface displayed on the touch screen of the computing device in accordance with the systems described herein, according to one example.

In one example, suppose the user sees an ellipsis in the text field that includes the content of the initial digital transcription. Also suppose that a segment of the initial timeline is rendered with the fill scheme that indicates the score for the section of the initial digital transcription that includes the ellipsis did not satisfy the predefined condition. The user may activate an option (e.g., by tapping on a region of a touch screen on which a button is rendered in the graphical user interface 114) to map the initial digital transcription to the initial timeline with finer granularity. In response, the graphical user interface 114 may render a view (e.g., as shown in the example of FIG. 2b below) in which sections of the initial digital transcription are displayed in separate respective text fields. Furthermore, each of the respective text fields may be connected by a respective indicator line to a respective point on the initial timeline that corresponds to the time interval in the initial audio recording from which the text in the respective text field was generated (e.g., transcribed). In this example, one of the respective text fields includes the ellipsis.

Figure 2C:
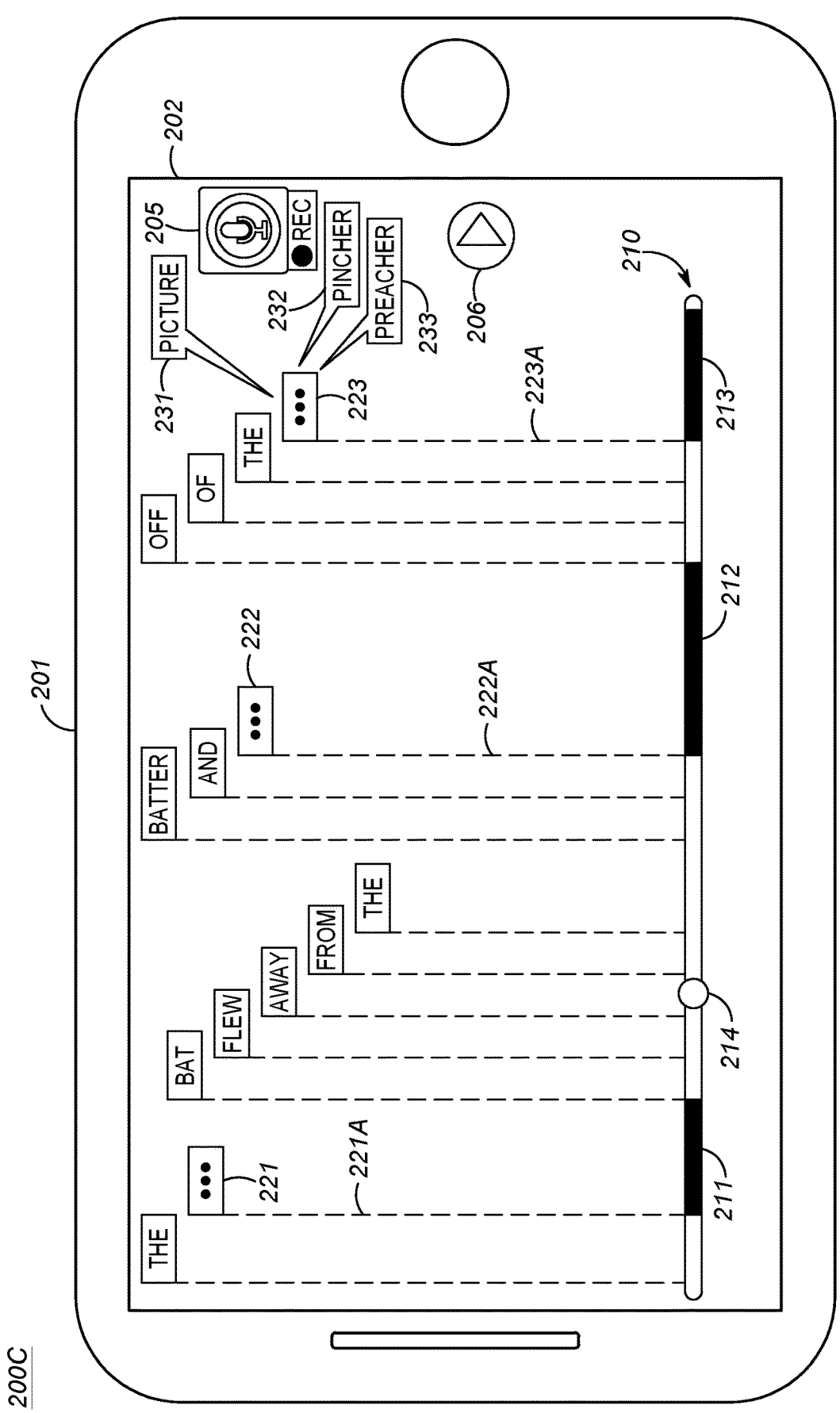
FIG. 2c illustrates a third view of the graphical user interface displayed on the touch screen of the computing device in accordance with the systems described herein, according to one example.

Next, suppose the user selects the text field (e.g., by clicking with a cursor or tapping on a touch screen associated with the computing device 110) that contains the ellipsis. In response, the graphical user interface 114 can render several alternative suggestions for text that could be used to replace the ellipsis in the initial digital transcription (e.g., as shown in the example of FIG. 2c below). The suggestions may have been generated and provided by the voice-transcription software module 124. For example, the suggestions may be based on context (e.g., words that commonly follow the words immediately preceding the ellipsis in the transcription or words that commonly precede the words immediately following the ellipsis in the transcription) or may represent multiple similar-sounding words (e.g., homonyms) that the voice-transcription software module 124 detected as possible candidates to match the portion of the initial audio recording that maps to the ellipsis. If the user selects one of the suggestions (e.g., by tapping on a touch screen or clicking with a cursor), the statement-collection application 112 can update the initial digital transcription by inserting the text of the selected suggestion into the initial digital transcription in place of the ellipsis. The statement-collection application 112 can also add metadata to the initial digital transcription to indicate that the text of the selected suggestion was selected by the user to replace the ellipsis. The graphical user interface 114 may also update the selected field to display the text of the selected suggestion.

Figure 2D:
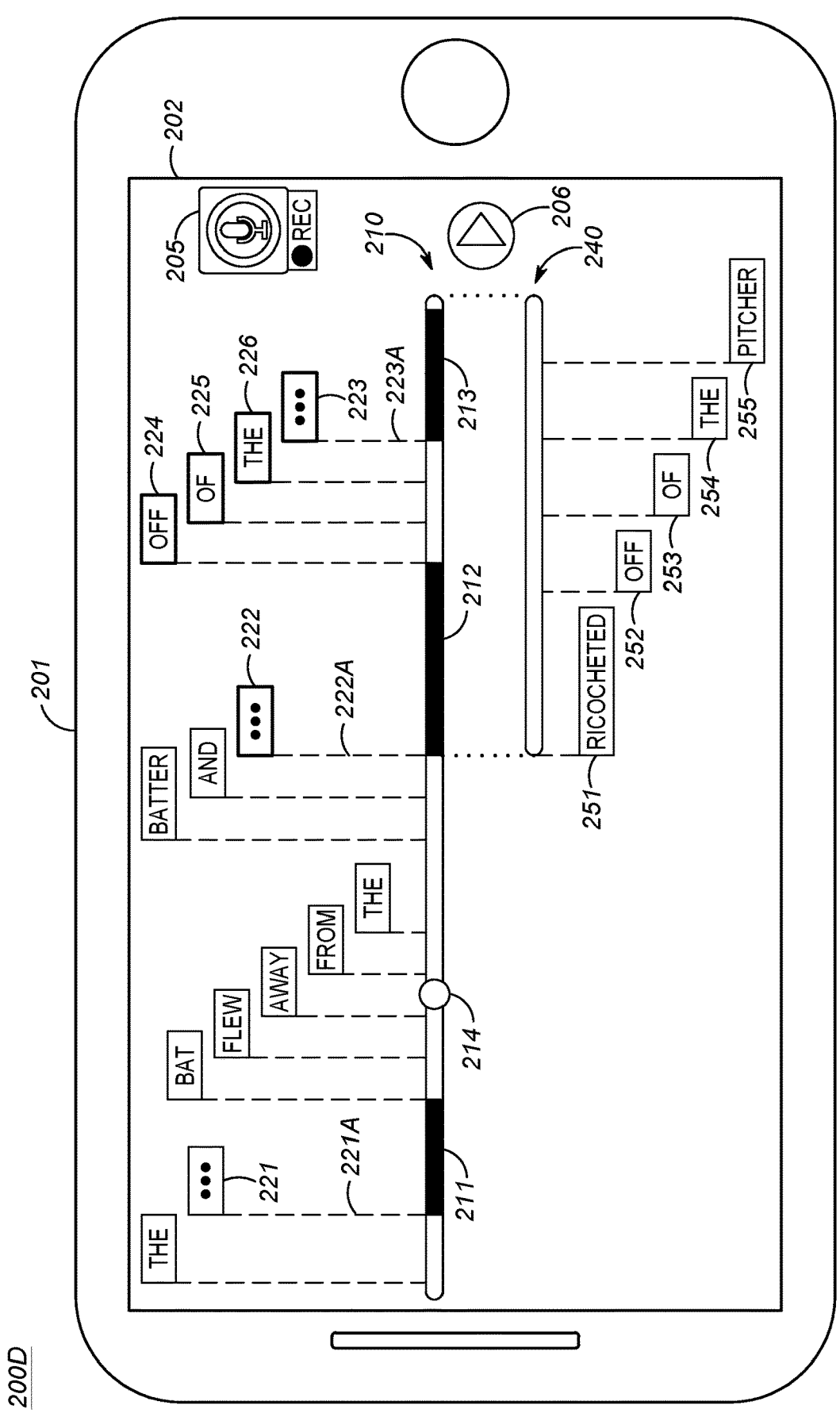
FIG. 2d illustrates a fourth view of the graphical user interface displayed on the touch screen of the computing device in accordance with the systems described herein, according to one example.

In another example, though, the user may not wish to accept any of the suggestions and may wish instead to re-record what the user said in the portion of the initial audio recording that maps to the ellipsis in the selected field. In this example, the user may activate (e.g., tap or click on) an element (e.g., a button) that triggers the statement-collection application 112 to commence capturing an additional (e.g., supplemental) audio recording of the user uttering replacement content that the user wishes to insert into the initial audio recording in place of the portion of the initial audio recording that maps the ellipsis. The graphical user interface 114 renders an additional timeline for the additional audio recording alongside the initial timeline for the initial audio recording (e.g., as shown in the example of FIG. 2d). A starting point of the additional timeline may be aligned with the point on the initial timeline that is connected by an indicator line to the selected text field. The statement-collection application 112 also generates an additional digital transcription of the additional audio recording via the voice-transcription software module 124. The graphical user interface 114 displays sections of the additional digital transcription in additional text fields and may render additional indicator lines to connect the additional text fields to respective points on the additional timeline that map to the time intervals in the additional audio recording from which the text in the additional text fields was generated (e.g., transcribed).

Once the user is finished vocalizing the content of the additional audio recording, the user can provide an input (e.g., tap or click on a button) to end the additional audio recording. The user can verify that the additional audio recording was correctly transcribed by viewing the text in the additional text fields and provide an input (e.g., tap or click on a button) to signify the user's approval. Furthermore, the statement-collection application 112 can also generate additional scores for sections of the additional digital transcription and verify that the additional scores satisfy the predefined condition (e.g., meet a predefined threshold).

Once the user indicates that the user is ready to submit the witness statement (e.g., by tapping or clicking on a button), the statement-collection application 112 generates an updated version of the initial audio recording. In the updated version of the initial audio recording, the portion of the initial audio recording that included the content that mapped to the ellipsis in the initial audio recording is replaced by the additional audio recording. This may be achieved, for example, by deleting the portion and inserting the additional recording into the initial audio recording at the point in time that marked the commencement of the deleted portion. The statement-collection application 112 also adds metadata to the updated version of the initial audio recording to specify where the inserted content (i.e., the additional audio recording) begins and ends.

The statement-collection application 112 further generates an updated version of the initial digital transcription. In the updated version of the initial digital transcription, the ellipsis is replaced by the additional digital transcription. This may be achieved, for example, by deleting the ellipsis and inserting the additional digital transcription into the position where the ellipsis was formerly located. The statement-collection application 112 also adds metadata to the updated version of the initial digital transcription to specify where the inserted content (i.e., the additional digital transcription) begins and ends.

Next, the statement-collection application 112 uploads the updated version of the initial audio recording, the initial audio recording (i.e., the original version before the portion was deleted and the additional audio recording was inserted), the initial digital transcription, the additional digital transcription, and the metadata (e.g., which specifies where replacements were made in the initial digital transcription and where replacements were made in the updated version of the initial audio recording) to the digital data repository 122 for storage.

The digital data repository 122 may comprise any combination of non-volatile storage elements (e.g., disc drives, removable memory cards or optical storage, solid state drives (SSDs), network attached storage (NAS), or a storage area-network (SAN)). Furthermore, data stored in the digital data repository 122 may be stored in any combination of databases (e.g., relational or non-relational), flat files, or other formats.

FIG. 2a illustrates a first view 200a of a graphical user interface displayed on a touch screen 202 of a computing device 201 (e.g., a smart phone) in accordance with the systems described herein, according to one example. In this example, suppose a user taps the recording button 205 to initiate recording, via a microphone associated with the computing device 201, an audible statement that the user utters. The audible statement uttered by the user is captured in an initial audio recording and is transcribed (e.g., as described above with respect to FIG. 1) into an initial digital transcription. The transcribed text is displayed in the multiline text field 203. In addition, the initial timeline 210 for the initial audio recording is rendered alongside the multiline text field 203. The initial timeline 210 includes a slider 214 that can be positioned along the initial timeline 210 (e.g., by pressing and dragging the slider 214 on the touch screen 202) to indicate from what point in the initial audio recording the user would like to commence playback in the event that the user taps on the play button 206.

As shown, the text in the multiline text field 203 includes three ellipses that indicate three sections of the initial digital transcription for which scores (e.g., generated in the manner described with respect to FIG. 1) did not satisfy a predefined condition. Thus, the level of confidence that words in the three sections of the initial digital transcription that include the ellipses were correctly identified was insufficient. The initial timeline 210 includes three segments that are rendered with a different fill scheme that the remainder of the initial timeline 210—namely, segment 211, segment 212, and segment 213. The segments 211, 212, 213 map to time intervals in the audio recording from which the three sections of the initial digital transcription were generated, respectively. The user, upon seeing the ellipses and the segments 211, 212, 213, may tap on the button 204 to see a more detailed view that maps the text shown in the multiline text field 203 to the initial timeline 210 with finer granularity.

FIG. 2b illustrates a second view 200b of the graphical user interface displayed on the touch screen 202 of the computing device 201 in accordance with the systems described herein, according to one example. Specifically, the second view 200b illustrates how the graphical user interface may appear after a user taps on the button 204 shown in FIG. 2a.

As shown, the transcribed text is now displayed in a plurality of text fields. Each of the text fields is connected to the initial timeline 210 by a respective indicator line. For example, the indicator line 221a connects the text field 221 to the segment 211. The connection effected by the indicator line 221a indicates that the segment 211 represents the time interval in the initial audio recording from which the text found in the text field 221 was generated. The ellipsis in the text field 221 indicates that the portion of the initial audio recording that maps to the time interval represented by the segment 211 was not able to be transcribed with a sufficient level of confidence. In other words, the score for the section of the initial digital transcription shown in the text field 221 did not satisfy a predefined condition.

Similarly, the indicator line 222a connects the text field 222 to the segment 212 and the indicator line 223a connects the text field 223 to the segment 213. The ellipses in the text fields 222, 223 similarly indicate that the portions of the initial audio recording that map to the time intervals represented by the segments 212, 213, respectively, were not able to be transcribed with a sufficient level of confidence (i.e., the scores for the sections of the initial digital transcription shown in the text fields 222, 223 did not satisfy the predefined condition). If the user wishes to see suggestions for words to replace the ellipses in the initial digital transcription, the user can select one of the text fields 221, 222, 223 (e.g., by pressing and holding or tapping the touch screen 202 on the text field the user wishes to select).

FIG. 2c illustrates a third view 200c of the graphical user interface displayed on the touch screen 202 of the computing device 201 in accordance with the systems described herein, according to one example. Specifically, the third view 200c illustrates how the graphical user interface may appear after a user selects the text field 223.

As shown, the callout text field 231, the callout text field 232, and the callout text field 233 include suggested words that the user may select to replace the ellipsis shown in the text field 223 in the initial digital transcription. Specifically, the callout text field 231 suggests the word "picture," while the callout text field 232 suggests the word "pincher" and the callout text field 233 suggests the word "preacher."

In this example, suppose the word that the user uttered in the portion of the initial audio recording that was transcribed as the ellipsis in the text field 223 and that maps to time interval represented by the segment 213 of the initial timeline 210 was actually "pitcher." The user may not wish to accept any of the suggestions provided in the callout text fields 231, 232, 233. Instead, the user may decide that it would be preferable to capture an additional audio recording to replace the portion of the initial audio recording that was transcribed as the ellipsis in the text field 223. To initiate the process of capturing the additional audio recording, the user may select the text field 223 and, if desired, any neighboring text fields that include text the user wishes to have replaced by content that will be transcribed from the additional audio recording.

FIG. 2d illustrates a fourth view 200d of the graphical user interface displayed on the touch screen 202 of the computing device 201 in accordance with the systems described herein, according to one example. Specifically, the fourth view 200d illustrates how the graphical user interface may appear after a user selects the text fields 222, 223, 224, 225, 226 (e.g., by pressing a finger against the touch screen 202 on the text field 223, dragging the finger across the touch screen 202 over the text fields 222, 224, 225, 226, and lifting the finger off of the touch screen 202) and taps the recording button 205 to signify that the user wishes to commence capturing the additional audio recording. As shown, the text fields 222, 223, 224, 225, 226 are outlined with thicker lines than the other text fields (e.g., text field 221) to signify that the text fields 222, 223, 224, 225, 226 are selected.

As shown, an additional timeline 240 for the additional audio recording is displayed alongside the initial timeline 210 for the initial audio recording. The starting end of the additional timeline 240 is aligned with the starting end of the segment 212. The starting end of the segment 212 maps to the start of the time interval in the initial audio recording from which the ellipsis in the text field 222 (which was recorded first in time out of the text fields 222-226) was generated. Thus, the alignment of the starting end of the additional timeline 240 with the starting end of the segment 212 of the initial timeline 210 signifies that the additional audio recording, if accepted by the user, will be used to replace the portion of the initial audio recording from which the text found in the text fields 222-226 was generated (e.g., transcribed).

The additional text fields 251, 252, 253, 254, 255 include the content of an additional digital transcription that is generated from the additional audio recording. Each of the additional text fields 251-255 is connected to the additional timeline 240 by a respective indicator line. The respective indicator lines connect the additional text fields 251-255 to locations along the additional timeline 240 that represent the respective starting points of time intervals in the additional audio recording from which the text found in the additional text fields 251-255 was generated.

There are no ellipses in the additional text fields 251-255 and there are no segments of the additional timeline 240 that are rendered with a fill scheme that matches the fill scheme of the segments 211, 212, 213. Thus, scores generated for the sections of the additional digital transcription shown in the additional text fields 251-255 satisfy the predefined condition. The additional digital transcription may be used to replace the sections of the initial digital transcription shown in the text fields 222-226.

Suppose the user also wants to capture a second additional audio recording to replace the portion of the initial audio recording from which the ellipsis in the text field 221 was generated. In particular, the user may realize that the content of the transcription may be ambiguous unless the ellipsis shown in the text field 221 is replaced by readable word. For example, if the ellipsis in the text field 221 were to be replaced by the word "baseball," the transcription would read as "the baseball bat flew away from the batter and ricocheted off of the pitcher" and a reader would likely envision a baseball bat flying out of the hands of a batter who was standing by home plate and striking a pitcher who was standing on a pitcher's mound. However, if the ellipsis in the text field 221 were to be replaced by the word "vampire," the transcription would read as "the vampire bat flew away from the batter and ricocheted off of the pitcher" and a reader might envision a vampire bat flying away from a bowl of cake batter in a kitchen and colliding with a pitcher full of water. Thus, for disambiguation purposes, the user may elect to capture a second additional audio recording to replace the portion of the initial audio recording from which the ellipsis in the text field 221 was generated.

Figure 2E:
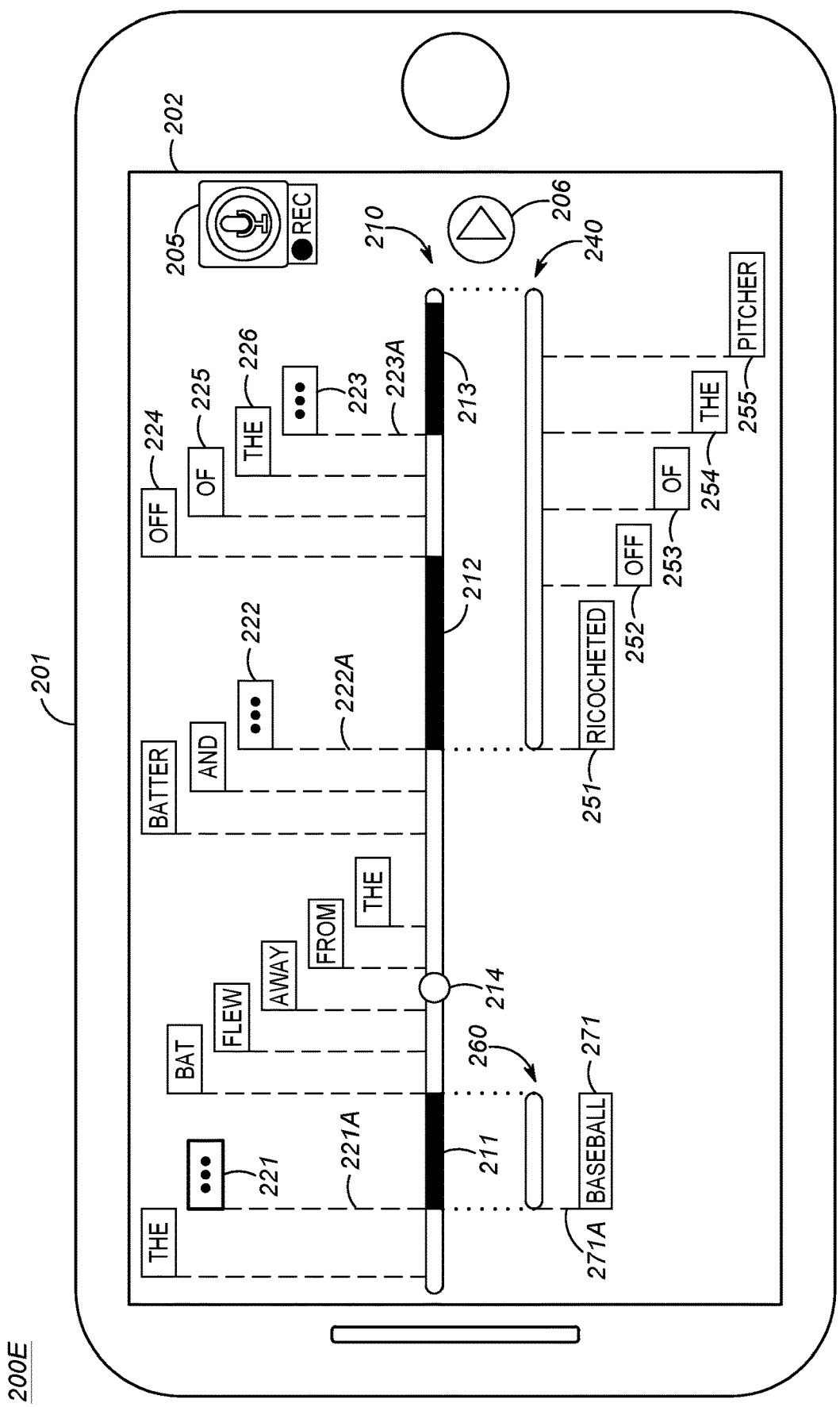
FIG. 2e illustrates a fifth view of the graphical user interface displayed on the touch screen of the computing device 3 in accordance with the systems described herein, according to one example.

FIG. 2e illustrates a fifth view 200e of the graphical user interface displayed on the touch screen 202 of the computing device 201 in accordance with the systems described herein, according to one example. Specifically, the fifth view 200e illustrates how the graphical user interface may appear after a user selects the text field 221 (e.g., by pressing a finger against the touch screen 202 on the text field 221) and taps the recording button 205 to signify that the user wishes to commence capturing the second additional audio recording. As shown, the text field 221 is outlined with thicker lines than the other text fields (e.g., text fields 222-225) to signify that the text field 221 is selected.

As shown, a second additional timeline 260 for the second additional audio recording is displayed alongside the initial timeline 210 for the initial audio recording. The starting end of the second additional timeline 260 is aligned with the starting end of the segment 211. The starting end of the segment 211 maps to the start of the time interval in the initial audio recording from which the ellipsis in the text field 221 was generated. Thus, the alignment of the starting end of the second additional timeline 260 with the starting end of the segment 211 of the initial timeline 210 signifies that the second additional audio recording, if accepted by the user, will be used to replace the portion of the initial audio recording from which the text found in the text field 221 was generated (e.g., transcribed).

The additional text field 271 includes the content of a second additional digital transcription that is generated from the second additional audio recording. The additional text field 271 is connected to the second additional timeline 260 by the indicator line 271a. The indicator line 271a connects the additional text field 271 to a location on the second additional timeline 260 that represents the starting point of a time interval in the second additional audio recording from which the text found in the text field 221 was generated.

Although the second additional timeline 260 is shown in as having a width that matches the width of the segment 211, the length (as measured in time) of the second additional audio recording is not constrained to equal the length (as measured in time) of the portion of the initial audio recording that maps to the segment 211. The scale of the second additional timeline 260 is adjusted to fit the width of the segment 211 so that the user will understand that the second additional audio recording will be spliced into the initial audio recording at the position indicated by the indicator line 221a after the portion of the initial audio recording that maps to the segment 211 is deleted. The scale of the additional timeline 240 does not have to match the scale of the initial timeline 210 for similar reasons.

There is no ellipsis in the additional text field 271 and there is no segment of the second additional timeline 260 that is rendered with the fill scheme that matches the fill scheme of the segments 211, 212, 213. Thus, a score generated for the section of the second additional digital transcription shown in the additional text field 271 satisfies the predefined condition. The second additional digital transcription may be used to replace the section of the initial digital transcription shown in the text field 221.

Once the user verifies that the additional digital transcription and the second additional digital transcription are acceptable, the user may provide one or more inputs to signify that the user wishes for the portion of the audio recording that maps to the time interval represented by the segment 211 to be replaced by the second additional recording and for the section of the transcription shown in the text field 221 to be replaced by the text shown in the additional text field 271. In one example, the user may press a finger against the touch screen 202 on the second additional timeline 260, drag the finger across the touch screen 202 to the segment 211, and lift the finger off of the touch screen 202. In another example, the user may press a finger against the touch screen 202 on the additional text field 271, drag the finger across the touch screen 202 to the text field 221, and lift the finger off of the touch screen 202. In another example, the user may simply tap, double tap, or press and hold a finger against the touch screen 202 on the second additional timeline 260 or on the additional text field 271. The user may provide one or more inputs in a similar fashion to signify that the user wishes to accept the additional audio recording and the additional digital transcription. Persons of skill in the art will understand that other types of inputs to communicate the user's acceptance may be used without departing from the spirit and scope of this disclosure.

Although the indicator lines shown in FIGS. 2a-e are depicted as straight lines that are in a vertical orientation, indicator lines in other examples are not constrained to being straight nor vertically oriented. Indicator lines may be curved and may be oriented horizontally, diagonally, vertically, or in some combination thereof (e.g., tangents to curved indicator lines may have any number of orientations). Furthermore, in some examples, indicator lines in a single view are not constrained to having the same orientation as each other nor to having the same conformation (e.g., straight or curved) as each other. Similarly, in other examples, the timelines and the text fields shown in FIGS. 2a-e may also be oriented in any direction (e.g., vertically, diagonally, or horizontally).

Figure 3:
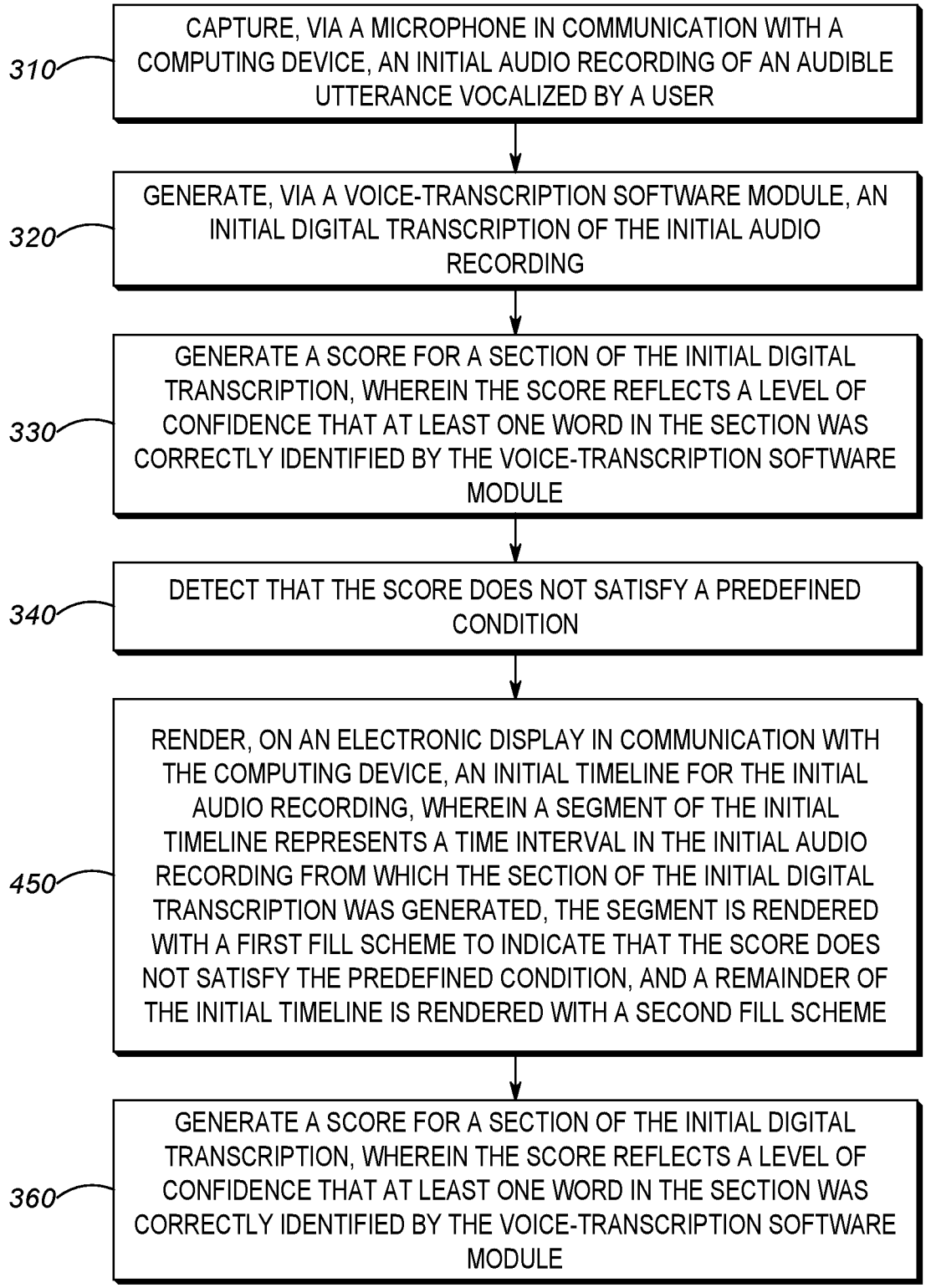
FIG. 3 illustrates functionality for systems disclosed herein, according to one example.

FIG. 3 illustrates functionality 300 for systems disclosed herein, according to one example. The functionality 300 does not have to be performed in the exact sequence shown. Also, various blocks may be performed in parallel rather than in sequence. Accordingly, the elements of the functionality 300 are referred to herein as "blocks" rather than "steps." The functionality 300 can be executed as instructions on a machine (e.g., by one or more processors), where the instructions are stored on a transitory or non-transitory computer-readable storage medium. While only six blocks are shown in the functionality 300, the functionality 300 may comprise other actions described herein. Also, in some examples, some of the blocks shown in the functionality 300 may be omitted without departing from the spirit and scope of this disclosure.

As shown in block 310, the functionality 300 includes capturing, via a microphone in communication with a computing device, an initial audio recording of an audible utterance vocalized by a user.

As shown in block 320, the functionality 300 includes generating, via a voice-transcription software module, an initial digital transcription of the initial audio recording.

As shown in block 330, the functionality 300 includes generating a score for a section of the initial digital transcription, wherein the score reflects a level of confidence that at least one word in the section was correctly identified by the voice-transcription software module.

As shown in block 340, the functionality 300 includes detecting that the score does not satisfy a predefined condition.

As shown in block 350, the functionality 300 includes rendering, on an electronic display in communication with the computing device, an initial timeline for the initial audio recording, wherein a segment of the initial timeline represents a time interval in the initial audio recording from which the section of the initial digital transcription was generated, the segment is rendered with a first fill scheme to indicate that the score does not satisfy the predefined condition, and a remainder of the initial timeline is rendered with a second fill scheme.

As shown in block 360, the functionality 300 includes rendering, on the electronic display, a field that indicates textual content of the section of the initial digital transcription. In one example, the textual content may be an ellipsis that was provided by default because the score does not satisfy the predefined condition.

The functionality 300 may further include detecting that the field has been selected via an input device in communication with the computing device; capturing, via the microphone, an additional audio recording of an additional audible utterance vocalized by the user; generating, via the voice-transcription software module, an additional digital transcription of the additional audio recording; rendering, on the electronic display, an additional timeline alongside the initial timeline, wherein a starting point of the additional timeline is aligned with a starting point of the segment, wherein the segment is associated with the field in that the field indicates content of the section of the initial digital transcription and the segment represents the time interval in the initial audio recording from which the section was generated; and rendering, on the electronic display, an additional field that indicates content of the additional digital transcription. The input device may be, for example, a touch screen.

The functionality 300 may further include receiving, via the input device, an indication that the content of the additional digital transcription accurately reflects a meaning that the user intended to communicate during the time interval in the initial audio recording; generating an updated version of the initial audio recording in which the segment is replaced by the additional audio recording; and generating, for the updated version of the initial audio recording, metadata that identifies where the segment was replaced.

The functionality 300 may further include generating an updated version of the initial digital transcription in which the content of the section of the initial digital transcription is replaced by the content of the additional digital transcription; and generating, for the updated version of the initial digital transcription, metadata that identifies where the section of the initial digital transcription was replaced.

The functionality 300 may further include transmitting the initial audio recording, the updated version of the initial audio recording, the metadata that identifies where the segment was replaced, the initial digital transcription, the updated version of the initial digital transcription, the score, and the metadata that identifies where the section of the initial digital transcription was replaced to a digital data repository via a computing network.

The functionality 300 may further include generating an additional score for the additional audio recording; detecting that the additional score satisfies the predefined condition; and replacing the textual content indicated by the field with the content indicated by the additional field.

The functionality 300 may further include rendering, on the electronic display, an indicator line that connects the field to the segment.

Figure 4:
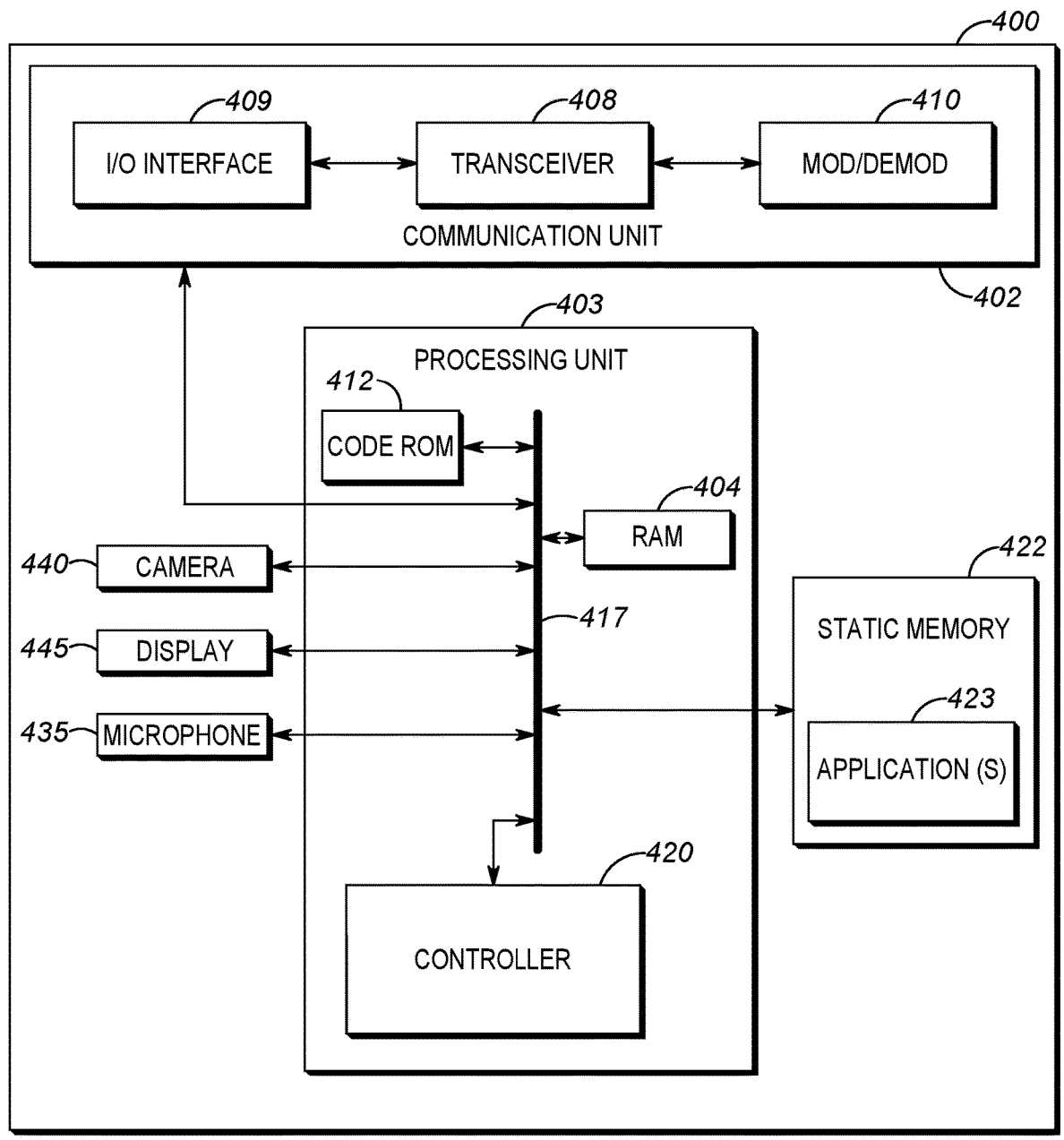
FIG. 4 illustrates a schematic block diagram of a computing device, according to one example.

FIG. 4 illustrates a schematic block diagram of a computing device 400, according to one example. The computing device 400 may be configured to capture an audio recording of witness statement uttered by a user, generate a transcription of the audio recording, allow the user to replace content that was incorrectly transcribed, and upload the one or more versions of the audio recording, one or more versions of the transcription, and metadata associated therewith, to a digital data repository (e.g., as described above with respect to FIGS. 1-3) via one or more different types of networks (e.g., networks with which the transceivers 408 may be adapted to communicate, as discussed in further detail below).

The computing device 400 may comprise a cellular phone (e.g., a smart phone), a satellite phone, a Voice over Internet Protocol (VoIP) phone, or a computer (e.g., a workstation, a laptop, a mobile tablet computer or a desktop computer) that is equipped with peripherals for recording a digital witness statement (e.g., a microphone 435, and a camera 440).

As depicted, the computing device 400 comprises a communication unit 402, a processing unit 403 (e.g., a processor), a Random-Access Memory (RAM) 404, one or more transceivers 408 (which may be wireless transceivers), one or more wired or wireless input/output (I/O) interfaces 409, a combined modulator/demodulator 410 (which may comprise a baseband processor), a code Read-Only Memory (ROM) 412, a common data and address bus 417, a controller 420, and a static memory 422 storing one or more applications 423.

The computing device 400 may also include a camera 440, a display 445, and a microphone 435 such that a user may use the computing device 400 to record a digital witness statement (e.g., by speaking into the microphone 435 or filming the user via the camera 440 while the user is in the act of speaking).

As shown in FIG. 4, the computing device 400 includes the communication unit 402 communicatively coupled to the common data and address bus 417 of the processing unit 403. The processing unit 403 may include the code Read Only Memory (ROM) 412 coupled to the common data and address bus 417 for storing data for initializing system components. The processing unit 403 may further include the controller 420 coupled, by the common data and address bus 417, to the Random-Access Memory 404 and the static memory 422. Persons of skill in the art will recognize that other configurations (e.g., configurations that include multiple buses) may also be used without departing from the spirit and scope of this disclosure.

The communication unit 402 may include one or more wired or wireless input/output (I/O) interfaces 409 that are configurable to communicate with other components and devices. For example, the communication unit 402 may include one or more transceivers 408 or wireless transceivers may be adapted for communication with one or more communication links or communication networks used to communicate with other components or computing devices. For example, the one or more transceivers 408 may be adapted for communication with one or more of the Internet (including public and private Internet Protocol (IP) networks), a private IP wide area network (WAN) including a National Emergency Number Association (NENA) i3 Emergency Services Internet Protocol (IP) network (ESInet), a Bluetooth network, a Wi-Fi network, for example operating in accordance with an Institute of Electrical and Electronics Engineers (IEEE) 802.11 standard (e.g., 802.11a, 802.11b, 802.11g, 802.11ax), a 3G standard network (including Global System for Mobiles (GSM) and Code Division Multiple Access (CDMA) standards), an LTE (Long-Term Evolution) network or other types of GSM networks, a 5G (including a network architecture compliant with, for example, the Third Generation Partnership Project (3GPP) Technical Specification (TS) 23 specification series and a new radio (NR) air interface compliant with the 3GPP TS 38 specification series) standard network, a Citizens Broadband Radio Service (CBRS), Worldwide Interoperability for Microwave Access (WiMAX) network, for example operating in accordance with an IEEE 802.16 standard, a landline telephonic network, a Low Earth Orbit (LEO) network (e.g., for satellite phones or Internet connection), a Geosynchronous Orbit (GEO) network (e.g., for satellite phones), an Evolution-Data Optimized (EV-DO) network, an Enhanced Data Rates for Global Evolution (EDGE) network, or another similar type of wireless network. Hence, the one or more transceivers 408 may include, but are not limited to, a cell phone transceiver, a Bluetooth transceiver, a CBRS transceiver, a Wi-Fi transceiver, a WiMAX transceiver, or another similar type of wireless transceiver configurable to communicate via a wireless radio network.

The one or more transceivers 408 may also comprise one or more wired transceivers, such as an Ethernet transceiver, a USB (Universal Serial Bus) transceiver, or similar transceiver configurable to communicate via a twisted pair wire, a coaxial cable, a fiber-optic link, or a similar physical connection to a wired network. The one or more transceivers 408 are also coupled to a combined modulator/demodulator 410.

The controller 420 may include ports (e.g., hardware ports) for coupling to other hardware components or systems (e.g., components and systems described with respect to FIG. 1). The controller 420 may also comprise one or more logic circuits, one or more processors, one or more microprocessors, one or more ASIC (application-specific integrated circuits), one or more FPGA (field-programmable gate arrays), or other electronic devices.

The static memory 422 is a non-transitory machine readable medium that stores machine readable instructions to implement one or more programs or applications (e.g., such as the statement-collection application 112 and the voice-transcription software module 124 described with respect to FIG. 1). Example machine readable media include a non-volatile storage unit (e.g. Erasable Electronic Programmable Read Only Memory ("EEPROM"), Flash Memory), or a volatile storage unit (e.g. random-access memory ("RAM")). In the example of FIG. 4, programming instructions (e.g., machine readable instructions) that implement the functional teachings of the computing device 400 as described herein are maintained, persistently, at the static memory 422 and used by the controller 420, which makes appropriate utilization of volatile storage during the execution of such programming instructions.

When the controller 420 executes the one or more applications 423, the controller 420 is enabled to perform one or more of the aspects of the present disclosure set forth earlier in the present specification (e.g., the computing device blocks set forth in FIG. 3). The one or more applications 423 may include programmatic algorithms, and the like, that are operable to perform electronic functions described with respect to FIGS. 1-3.

Examples are herein described with reference to flowchart illustrations and/or block diagrams of methods, apparatus (systems) and computer program products according to various examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., cannot splice audio files, and cannot render graphical elements such as timelines, text fields, indicator lines, and buttons on a digital display, among other features and functions set forth herein).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1%, and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some examples may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
capturing, via a microphone in communication with a computing device, an initial audio recording of an audible utterance vocalized by a user;
generating, via a voice-transcription software module, an initial digital transcription of the initial audio recording;
generating a score for a section of the initial digital transcription, wherein the score reflects a level of confidence that at least one word in the section was correctly identified by the voice-transcription software module;
detecting that the score does not satisfy a predefined condition;
rendering, on an electronic display in communication with the computing device, an initial timeline for the initial audio recording, wherein a segment of the initial timeline represents a time interval in the initial audio recording from which the section of the initial digital transcription was generated, the segment is rendered with a first fill scheme to indicate that the score does not satisfy the predefined condition, and a remainder of the initial timeline is rendered with a second fill scheme;
rendering, on the electronic display, a field that indicates textual content of the section of the initial digital transcription;
detecting that the field has been selected via an input device in communication with the computing device;
capturing, via the microphone, an additional audio recording of an additional audible utterance vocalized by the user;
generating, via the voice-transcription software module, an additional digital transcription of the additional audio recording;
rendering, on the electronic display, an additional timeline alongside the initial timeline, wherein a starting point of the additional timeline is aligned with a starting point of the segment, wherein the segment is associated with the field in that the field indicates content of the section of the initial digital transcription and the segment represents the time interval in the initial audio recording from which the section was generated; and rendering, on the electronic display, an additional field that indicates content of the additional digital transcription.

2. The method of claim 1, further comprising:
receiving, via the input device, an indication that the content of the additional digital transcription accurately reflects a meaning that the user intended to communicate during the time interval in the initial audio recording;
generating an updated version of the initial audio recording in which the segment is replaced by the additional audio recording; and
generating, for the updated version of the initial audio recording, metadata that identifies where the segment was replaced.

3. The method of claim 2, further comprising:
generating an updated version of the initial digital transcription in which the content of the section of the initial digital transcription is replaced by the content of the additional digital transcription; and
generating, for the updated version of the initial digital transcription, metadata that identifies where the section of the initial digital transcription was replaced.

4. The method of claim 3, further comprising:
transmitting the initial audio recording, the updated version of the initial audio recording, the metadata that identifies where the segment was replaced, the initial digital transcription, the updated version of the initial digital transcription, the score, and the metadata that identifies where the section of the initial digital transcription was replaced to a digital data repository via a computing network.

5. The method of claim 1, further comprising:
generating an additional score for the additional audio recording;
detecting that the additional score satisfies the predefined condition; and
replacing the textual content indicated by the field with the content indicated by the additional field.

6. The method of claim 1, further comprising:
rendering, on the electronic display, an indicator line that connects the field to the segment.

7. A non-transitory computer-readable storage medium containing instructions that, when executed by one or more processors, perform a set of actions comprising:
capturing, via a microphone in communication with a computing device, an initial audio recording of an audible utterance vocalized by a user;
generating, via a voice-transcription software module, an initial digital transcription of the initial audio recording;
generating a score for a section of the initial digital transcription, wherein the score reflects a level of confidence that at least one word in the section was correctly identified by the voice-transcription software module;
detecting that the score does not satisfy a predefined condition;
rendering, on an electronic display in communication with the computing device, an initial timeline for the initial audio recording, wherein a segment of the initial timeline represents a time interval in the initial audio recording from which the section of the initial digital transcription was generated, the segment is rendered with a first fill scheme to indicate that the score does not satisfy the predefined condition, and a remainder of the initial timeline is rendered with a second fill scheme;
rendering, on the electronic display, a field that indicates textual content of the section of the initial digital transcription;
detecting that the field has been selected via an input device in communication with the computing device;
capturing, via the microphone, an additional audio recording of an additional audible utterance vocalized by the user;
generating, via the voice-transcription software module, an additional digital transcription of the additional audio recording;
rendering, on the electronic display, an additional timeline alongside the initial timeline, wherein a starting point of the additional timeline is aligned with a starting point of the segment, wherein the segment is associated with the field in that the field indicates content of the section of the initial digital transcription and the segment represents the time interval in the initial audio recording from which the section was generated; and
rendering, on the electronic display, an additional field that indicates content of the additional digital transcription.

8. The non-transitory computer-readable storage medium of claim 7, wherein the set of actions further comprises:
receiving, via the input device, an indication that the content of the additional digital transcription accurately reflects a meaning that the user intended to communicate during the time interval in the initial audio recording;
generating an updated version of the initial audio recording in which the segment is replaced by the additional audio recording; and
generating, for the updated version of the initial audio recording, metadata that identifies where the segment was replaced.

9. The non-transitory computer-readable storage medium of claim 8, wherein the set of actions further comprises:
generating an updated version of the initial digital transcription in which the content of the section of the initial digital transcription is replaced by the content of the additional digital transcription; and
generating, for the updated version of the initial digital transcription, metadata that identifies where the section of the initial digital transcription was replaced.

10. The non-transitory computer-readable storage medium of claim 9, wherein the set of actions further comprises:
transmitting the initial audio recording, the updated version of the initial audio recording, the metadata that identifies where the segment was replaced, the initial digital transcription, the updated version of the initial digital transcription, the score, and the metadata that identifies where the section of the initial digital transcription was replaced to a digital data repository via a computing network.

11. The non-transitory computer-readable storage medium of claim 7, wherein the set of actions further comprises:
generating an additional score for the additional audio recording;
detecting that the additional score satisfies the predefined condition; and
replacing the textual content indicated by the field with the content indicated by the additional field.

12. The non-transitory computer-readable storage medium of claim 7, wherein the set of actions further comprises:

rendering, on the electronic display, an indicator line that connects the field to the segment.

13. A system comprising:
one or more processors; and
a memory containing instructions thereon which, when executed by the one or more processors, cause the processors to perform a set of actions comprising:
capturing, via a microphone in communication with a computing device, an initial audio recording of an audible utterance vocalized by a user;
generating, via a voice-transcription software module, an initial digital transcription of the initial audio recording;
generating a score for a section of the initial digital transcription, wherein the score reflects a level of confidence that at least one word in the section was correctly identified by the voice-transcription software module;
detecting that the score does not satisfy a predefined condition;
rendering, on an electronic display in communication with the computing device, an initial timeline for the initial audio recording, wherein a segment of the initial timeline represents a time interval in the initial audio recording from which the section of the initial digital transcription was generated, the segment is rendered with a first fill scheme to indicate that the score does not satisfy the predefined condition, and a remainder of the initial timeline is rendered with a second fill scheme;
rendering, on the electronic display, a field that indicates textual content of the section of the initial digital transcription;
detecting that the field has been selected via an input device in communication with the computing device;
capturing, via the microphone, an additional audio recording of an additional audible utterance vocalized by the user;
generating, via the voice-transcription software module, an additional digital transcription of the additional audio recording;
rendering, on the electronic display, an additional timeline alongside the initial timeline, wherein a starting point of the additional timeline is aligned with a starting point of the segment, wherein the segment is associated with the field in that the field indicates content of the section of the initial digital transcription and the segment represents the time interval in the initial audio recording from which the section was generated; and
rendering, on the electronic display, an additional field that indicates content of the additional digital transcription.

14. The system of claim 13, wherein the set of actions further comprises:
receiving, via the input device, an indication that the content of the additional digital transcription accurately reflects a meaning that the user intended to communicate during the time interval in the initial audio recording;
generating an updated version of the initial audio recording in which the segment is replaced by the additional audio recording; and
generating, for the updated version of the initial audio recording, metadata that identifies where the segment was replaced.

15. The system of claim 14, wherein the set of actions further comprises:
generating an updated version of the initial digital transcription in which the content of the section of the initial digital transcription is replaced by the content of the additional digital transcription; and
generating, for the updated version of the initial digital transcription, metadata that identifies where the section of the initial digital transcription was replaced.

16. The system of claim 15, wherein the set of actions further comprises:
transmitting the initial audio recording, the updated version of the initial audio recording, the metadata that identifies where the segment was replaced, the initial digital transcription, the updated version of the initial digital transcription, the score, and the metadata that identifies where the section of the initial digital transcription was replaced to a digital data repository via a computing network.

17. The system of claim 13, wherein the set of actions further comprises:
generating an additional score for the additional audio recording;
detecting that the additional score satisfies the predefined condition; and
replacing the textual content indicated by the field with the content indicated by the additional field.

* * * * *